US006114041A

United States Patent [19]

Tan et al.

[11] Patent Number: 6,114,041

[45] Date of Patent: Sep. 5, 2000

[54] FUSER MEMBER WITH SURFACE TREATED $AL_2O_3$ AND FUNCTIONALIZED RELEASE FLUIDS

[75] Inventors: Biao Tan, Rochester; Jiann H. Chen, Fairport; Tonya D. Binga; Douglas B. Wilkins, both of Rochester, all of N.Y.

[73] Assignee: Eastman Kodak Company, Rochester, N.Y.

[21] Appl. No.: 08/962,129

[22] Filed: Oct. 31, 1997

[51] Int. Cl.[7] ............................ G03G 15/20; B32B 5/16; B32B 27/00; B32B 27/08

[52] U.S. Cl. .......................... 428/421; 428/328; 428/329; 428/331; 428/405; 428/422; 428/450; 428/906; 492/56; 492/59; 399/331; 399/332; 399/333

[58] Field of Search .................................... 428/421, 422, 428/405, 450, 36.9, 331, 328, 329, 906; 492/56, 59, 48; 399/333, 331, 332

[56] References Cited

U.S. PATENT DOCUMENTS

| | | | |
|---|---|---|---|
| 4,185,140 | 1/1980 | Strella et al. | 428/418 |
| 5,017,432 | 5/1991 | Eddy et al. | 428/422 |
| 5,153,657 | 10/1992 | Yu et al. | 399/350 |
| 5,217,837 | 6/1993 | Henry et al. | 430/124 |
| 5,269,740 | 12/1993 | Fitzgerald et al. | 492/56 |
| 5,292,562 | 3/1994 | Fitzgerald et al. | 428/35.8 |
| 5,292,606 | 3/1994 | Fitzgerald | 428/35.8 |
| 5,401,570 | 3/1995 | Heeks et al. | 428/332 |
| 5,464,698 | 11/1995 | Chen et al. | 428/421 |
| 5,480,724 | 1/1996 | Fitzgerald et al. | 428/447 |
| 5,595,823 | 1/1997 | Chen et al. | 428/421 |
| 5,824,416 | 10/1998 | Chen et al. | 428/422 |
| 5,851,673 | 12/1998 | Chen et al. | 428/421 |

OTHER PUBLICATIONS

Alger, Polymer Science Dictionary, 2nd Edition, Chapman & Hall, pp. 79–80, Apr. 1999.

*Primary Examiner*—Paul Thibodeau
*Assistant Examiner*—Ramsey Zacharia
*Attorney, Agent, or Firm*—Doreen M. Wells

[57] ABSTRACT

A fuser member having improved toner offset release and wear characteristics. The outermost layer comprises a fluoroelastomer with thermally conductive fillers which are surface treated with a coupling agent that is interactive with the fluoroelastomer and with a release agent which may, optionally, be used on the surface of the fluoroelastomer layer.

21 Claims, No Drawings

FUSER MEMBER WITH SURFACE TREATED $AL_2O_3$ AND FUNCTIONALIZED RELEASE FLUIDS

CROSS REFERENCE TO RELATED APPLICATIONS

This application is related to the following commonly owned U.S. applications filed on even date herewith: U.S. Ser. No. 08/961,835 now issued as U.S. Pat. No. 5,948,352 of Tan, Chen, Binga and Wilkins, titled FUSER MEMBER WITH CHEMICALLY MODIFIED ELASTOMER/FILLERS AND FUNCTIONALIZED RELEASE FLUIDS, and U.S. Ser. No. 08/962,108 now issued as U.S. Pat. No. 5,935,742 of Tan, Chen, Binga and Staudenmayer, titled FUSER MEMBER WITH SURFACE TREATED $SnO_2$ FILLER.

FIELD OF THE INVENTION

This invention relates generally to heat fusing members and methods of making same. More particularly, it relates to an improved fuser roller surface that decreases toner offset and abrasion and increases toner release and thermal conductivity.

BACKGROUND OF THE INVENTION

In electrophotographic fuser systems, fuser roller overcoats are made with layers of polydimethylsiloxane (PDMS) elastomers, fluorocarbon resins and fluorocarbon elastomers. PDMS elastomers have low surface energy and relatively low mechanical strength, but is adequately flexible and elastic and can produce high quality fused images. After a period of use, however, the self-release property of the roller degrades and offset begins to occur. Application of a PDMS oil during use enhances the release property of the fuser roller surface but shortens roller life due to oil swelling. Fluorocarbon resins like polytetrafluoroethylene (PTFE) have good release property but less flexibility and elasticity than PDMS elastomers. Fluorocarbon elastomers, such as Viton™ and Fluorel™, are tough, flexible, resistant to high temperatures, durable and do not swell, but they have relatively high surface energy and poor thermal conductivity.

Particulate inorganic fillers have been added to fluorocarbon elastomers and silicone elastomers to increase mechanical strength and thermal conductivity. High thermal conductivity is an advantage because heat needs to be efficiently and quickly transmitted from an internally heated core to the cuter surface of the fuser roller to fuse the toners and yield the desired toner images. However, incorporation of inorganic fillers to improve thermal conductivity has a major drawback: it increases the surface energy of fuser roller surface and also increases the interaction of the filler with the toner and receiver. After a period of use, the toner release properties of the roller degrade and toner offset begins to occur due to roller wear and weak interaction between the filler and the polymer matrix. It would be desirable to provide a fuser member having a fluorocarbon elastomer overcoat layer containing thermally conductive inorganic filler, but which still has a moderately low surface energy and good toner release property. In addition, it should be compatible with the functionalized polymeric release agent employed during fixing process.

Fuser members of fluorocarbon elastomer containing inorganic filler are disclosed, for example, U.S. Pat. No. 5,464,698 to Chen et al. which describes fuser rollers having a surface layer comprising fluorocarbon elastomer and tin oxide fillers. The fillers provide active sites for reacting the mercapto-functional polydimethylsiloxane. However, the inorganic fillers are untreated and remain highly reactive with the toner and charge control agent, and this is undesirable.

U.S. Pat. No. 5,595,823 to Chen et al. describes fuser rollers having a surface layer comprising fluorocarbon elastomer and aluminum oxide fillers which also are untreated and are prone to high reactivity with toner and charge control agent which, again, is undesirable.

U.S. Pat. No. 5,017,432 to Eddy et al. describes a fluorocarbon elastomer fuser member which contains cupric oxide to interact with the polymeric release agent and provide an interfacial barrier layer.

Fuser members of condensation-crosslinked PDMS elastomers filled with metal oxides are disclosed, for example, in U.S. Pat. No. 5,401,570 to Heeks et al. This patent describes a silicone rubber fuser member containing aluminum oxide fillers which react with a silicone hydride release oil.

U.S. Pat. No. 5,480,724 to Fitzgerald et al. discloses tin oxide fillers which decrease fatigue and creep (or compression) of the PDMS rubber during continuous high temperature and high stress (i.e. pressure) conditions.

Some metal oxide filled condensation-cured PDMS elastomers are also disclosed in U.S. Pat. No. 5,269,740 (cupric oxide filler), U.S. Pat. No. 5,292,606 (zinc oxide filler), U.S. Pat. No. 5,292,562 (chromium oxide filler), and U.S. Pat. No. 5,336,596 (nickel oxide filler). All provide good results.

Unfortunately, as fuser rollers wear, the metal oxide fillers that are exposed react not only with the functionalized polymeric release agent, but also with the toner, paper substrate and charge control agent. Such reactions build up debris on the surface of the fuser roller, causing deterioration of toner release and great reduction in the life of the fuser roller. Thus, there remains a need for fuser members whose metal oxide fillers are made to enhance the interaction between elastomer and filler and also between the polymeric release agent and filler.

SUMMARY OF THE INVENTION

The present invention provides an effective way to solver the problems described above. By filling a fluorocarbon elastomer with metal oxide particles treated with a coupling agent , the present invention provides a fuser member with the desired thermal conductivity and toner release properties.

More particularly, the invention provides a fuser member comprising a support and coated thereon a fluoroelastomer layer comprising a metal oxide filler, said filler having been treated with a silane coupling agent.

The present invention also provides a method of making a fuser member comprising the steps of a) providing a cylindrical core; b) compounding a fluoroelastomer with a metal oxide filler that has been treated with a silane coupling agent; c) coating the fluoroelastomer on the cylindrical core; and d) curing the fuser member.

Metal oxide fillers which have been thus modified can interact with fluorocarbon polymers and bond with them. Such fillers also help to wet the surface and thereby facilitate compounding. The fuser member of the invention greatly improves fuser/toner release, toner offset on the roller surface and decreases abrasion of the fuser member overcoat. The invention provides an effective, durable fuser roller and high quality copies at high speed.

The toner/fuser release can be further improved by applying to the outermost layer of the fuser member a n effective amount of a polymethyldisiloxane (PDMS) release agent that, optionally, includes at least one functional group reactive with the fluoroelastomer, followed by incubation at an elevated temperature. While not wishing to be bound by the proposed theory, it is believed that the functional groups on the coupling agent bring about an interaction between filler and release fluid, thereby forming a protective layer between toner and filler.

An additional advantage is that this invention allows for a high percentage of metal oxide fillers i n th e fluoroelastomer and therefore high thermal conductivity can be achieved. At the same time, critical fuser properties such as release and wear are not sacrificed.

DETAILED DESCRIPTION OF THE INVENTION

The fluorocarbon elastomers used in the invention were prepared according to the method described in commonly owned U.S. Ser. No. 08/805,479 of Chen et al. filed Feb. 25, 1997, titled TONER FUSER MEMBER HAVING A METAL OXIDE FILLED FLUOROELASTOMER OUTER LAYER WITH IMPROVED TONER RELEASE as follows.

In the fuser member of th e present invention, the outermost layer comprises a cured fluoroelastomer, preferably a terpolymer of vinylidene fluoride (VF), tetrafluoroethylene (TFE), and hexafluoropropylene (HFP), that includes at least about 21 mole percent HFP and, preferably, at least about 50 mole percent VF. Among commercially available fluoroelastomers, Viton™ materials, obtainable from DuPont, are frequently employed for the fabrication of fuser members. These materials include Viton™ A, containing 25 mole percent HFP; Viton™ E45, containing 23 mole percent HFP; and Viton™ GF, containing 34 mole percent HFP.

A preferred fluoroelastomer for the outermost layer of the fuser member of the present invention is Fluorel™ FX-9038, available from 3M, containing 52 mole percent VF, 34 mole percent TFE, and 14 mole percent HFP. More preferred is Fluorel™ FE-5840Q, also available from 3M, containing 53 mole percent VF, 26 mole percent TFE, and 21 mole percent HFP.

At least 10 parts by weight of metal oxide per 100 parts by weight of cured fluoroelastomer are included in the outermost layer of the fuser member. The metal oxide may be cupric oxide, aluminum oxide, or mixtures thereof. In a preferred embodiment, 10 to 50 parts of cupric oxide are included in the outermost layer. Alumina may also be included as a thermally conductive filler in the layer; in one embodiment, 120 parts per 100 parts (by weight) of fluoroelastomer are incorporated.

The preferred silane coupling has the general structure:

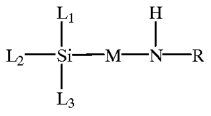

or

-continued

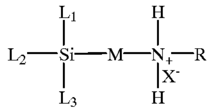

wherein

M=aliphatic or aromatic chain with C atom numbers vary from 0–20.

R=proton, phenyl or alkyl, etc.

$L_1$, $L_2$, $L_3$=Alkoxy, alkyl, halide, etc. with C atom numbers vary from 0–10 and at least one of the L should be alkoxy or halide.

X=negative counter ion, e.g. chloride ion, bromide ion, etc.

Suitable coupling agents are 3-aminopropyltrimethoxysilane, 3-aminopropyltriethoxysilane, N-phenylaminopropyltrimethoxysilane, (aminoethylaminomethyl)phenethyltrimethoxysilane, aminophenyltrimethoxysilane, 3-aminopropyldimethoxysilane, 3-aminopropylmethyldiethoxysilane, 3-(2-aminoethylamino)propyltrimethoxysilane, 3-(2-N-benzylaminoethylaminopropyl)trimethoxysilane hydrochloride, etc.

Although the fuser member of the invention, wherein the metal oxide particles have been treated with a coupling agent, exhibits generally good toner offset and release characteristics, these properties may be improved by applying a polydimethylsiloxane (PDMS) release agent to the outermost layer and incubating the fuser member to form a surface that displays enhanced toner release. Preferred PDMS release agents, which include a functional group that is reactive with the fluoroelastomer, have the formula

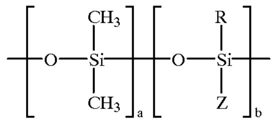

where R is alkyl or aryl, Z is selected from the group consisting of hydrogen, aminoalkyl containing up to about 8 carbon atoms, and mercaptoalkyl containing up to about 8 carbon atoms, and the ratio of a:b is about 1:1 to 3000:1. In more preferred embodiments, Z is hydrogen, aminopropyl, or mercaptopropyl. In a particularly preferred embodiment, Z is hydrogen and the a:b ratio is about 10:1 to 200:1. In another particularly preferred embodiment, Z is aminopropyl and the a:b ratio is about 200:1 to 2,000:1.

An example of a hydrogen-functionalized PDMS release agent is EK/PS-124.5 (available from United Chemical), which contains 7.5 mole percent of the functionalized component and has a viscosity of 225 centistokes. Xerox amino-functionalized PDMS 8R3995 fuser agent II contains 0.055 mole percent of an aminopropyl-substituted component and has a viscosity of 300 centistokes. Xerox mercapto-functionalized PDMS 8R2955 contains 0.26 mole percent of a mercaptopropyl-substituted component and has a viscosity of 275 centistokes. A non-functionalized PDMS release oil, DC-200 (from Dow Corning), is useful for purposes of comparison with the functionalized agents and has a viscosity of 350 centistokes.

Materials

Fluorel™ FE Fluoroelastomer 5840Q, ter-polymer of vinylidene fluoride, hexafluoropropylene and tetrafluoroethylene (FE5840Q)-3M, Co.

MgO (Maglite™ D)—Merck/Calgon Corp.

$Ca(OH)_2$—Aldrich®

$Al_2O_3$ (T-64)—Whitaker Clark & Daniels, Inc.

CuO—J. T. Baker®

3-Aminopropyltriethoxylsilane (NCR)—PCR®

The invention is further illustrated by the following examples and comparative examples.

EXAMPLE 1 (E-1)

Treatment of filler surface with coupling reagent solution:

Treatment solution was freshly prepared by adding aminopropyltriethoxylsilane (2wt. %) to $EtOH/H_2O$ (95/5 by vol.) solvent and stirred for 10 minutes. Fillers ($Al_2O_3$ or CuO or mixtures thereof) were covered by solution and stirred in ultrasonic bath for 10 minutes. Fillers were then washed twice with EtOH and dried under reduced pressure (under vacuum) at 150° C. for 30 minutes and at room temperature overnight.

Compounding:

Fluorel™ FE5840Q (100 gm), MgO (3 gm), Ca(OH)2 (6 gm) and surface treated $Al_2O_3$ metal oxide fillers—(120 gm) and CuO (10 gm)—were thoroughly compounded in a two roll mill with water cooling at 63° F. (17° C.) until a uniform, dry composite sheet was obtained.

Preparation of a compression mold slab:

The fluoroelastomer-treated fillers gum obtained as described above was compression molded into 75-mil plaques, with curing for 20 minutes at 350° F. (177° C.) under 45 tons pressure and post-curing for 48 hours at 450° F. (232° C.). The plaques were employed in tests to evaluate the toner offset and release characteristics, wear and thermal conductivity as described below and results are indicated in Table 1.

EXAMPLE 2 (E-2)

Example 2 was carried out by following essentially the same procedure as described for Example 1 except that 30 parts of treated CuO was used instead of 10 parts of treated CuO.

EXAMPLE 3 (E-3)

Example 3 was carried out by following essentially the same procedure as described for Example 1 except that 50 parts of treated CuO was used instead of 10 parts of treated CuO.

EXAMPLE 4 (E-4)

Example 4 was carried out by following essentially the same procedure as described for Example 1 except that 50 parts of treated CuO was used instead of 10 parts of treated CuO and 140 parts of treated $Al_2O_3$ was used instead of 120 parts of treated $Al_2O_3$.

COMPARATIVE EXAMPLE 1 (C-1)

Substantially the same procedure as in Example 1, except that the $Al_2O_3$ and CuO fillers were not surface treated. The results are indicated in Table 1.

COMPARATIVE EXAMPLE 2 (C-2)

Substantially the same procedure as in Example 4, except that the $Al_2O_3$ and CuO fillers were not surface treated. The results are indicated in Table 1.

Test Methods for Results in Table 1

The three tests described immediately below were conducted using the plaques of Example 1 above. Results appear in Table 1.

Toner offset release measurement

These procedures are described in U.S. Ser. No. 08/805,479 of Chen et al. filed Feb. 25, 1997, titled TONER FUSER MEMBER HAVING A METAL OXIDE FILLED FLUOROELASTOMER OUTER LAYER WITH IMPROVED TONER LEASE as follows.

The test plaques obtained as described above are employed to evaluate the toner offset and release force characteristics of the outermost layer of the fuser members. A plaque was cut into 1-inch (2.56-cm) squares. One of these squares was left untreated by release agent. To the surface of the other square was applied in unmeasured amount PDMS release oils: Xerox amino-functionalized PDMS 8R7™.

Each sample was incubated overnight at a temperature of 175° C. Following this treatment, the surface of each sample was wiped with dichloromethane. Each sample was then soaked in dichloromethane for one hour and allowed to dry before off-line testing for toner offset and release properties.

Each sample, including those untreated with release agent, was tested in the following manner:

A 1-inch (2.56-cm) square of paper covered with unfused styrene-butyl acrylate toner was placed in contact with a sample on a bed heated to 175° C., and a pressure roller set for 80 psi was locked in place over the laminate to form a nip. After 20 minutes the roller was released from the laminate.

The extent of offset for each sample was determined by microscopic examination of the sample surface following delamination. The following numerical evaluation, corresponding to the amount of toner remaining on the surface, was employed.

| | |
|---|---|
| 1 | 0% offset |
| 2 | 1–20% offset |
| 3 | 21–50% offset |
| 4 | 51–90% offset |
| 5 | 91–100% offset |

Qualitative assessment of the force required for delamination of the paper from the sample is as follows:

| | |
|---|---|
| 1 | low release force |
| 2 | moderate release force |
| 3 | high release force |

Wear measurement

A piece of plaque 9/16"×2" was cut for the wear test. A Norman abrader (by Norman Tool, Inc.) was used, and the temperature was set at 350° F. The speed was set at ~30 cycles/minute and the load was set at 984 g.

Four rolls of paper were run on the plaque sample for 480 cycles each and the wear tracks were measured for depth by a surfanalyzer. The average of the four tracks was reported in mils.

Thermal Conductivity Measurement

A round piece of plaque 5 cm diameter was cut for the test. Thermal conductivity was measured by Holometrix™ TCA-100 Thermal Conductivity Analyzer. Reported values (BTU/hr-ft-° F.) were from two stacks of samples.

TABLE 1

FE5840Q 100 pt with 3 parts MgO/3 parts $Ca(OH)_2$ (3:6)

| Sample ID | Fillers | Coupling Reagent | Offset/Release with amino-PDMS oil | Wear | Thermal Conductivity |
|---|---|---|---|---|---|
| C-1 | $Al_2O_3$ 120 pt CuO, 10 pt | none | 2/2 | 4.2 | 0.31 |
| C-2 | $Al_2O_3$ 140 pt CuO, 50 pt | none | 2/2 | 6.4 | 0.39 |
| E-1 | $Al_2O_3$ 120 pt CuO, 10 pt | Solution NCR | 1/1 | 1.5 | 0.30 |
| E-2 | $Al_2O_3$ 120 pt CuO, 30 pt | Solution NCR | 1/1 | 2.1 | 0.32 |
| E-3 | $Al_2O_3$ 120 pt CuO, 50 pt | Solution NCR | 1/1 | 3.3 | 0.34 |
| E-4 | $Al_2O_3$ 140 pt CuO, 50 pt | Solution NCR | 1/2 | 3.1 | 0.38 |

NCR—3-Aminopropyltriethoxysilane

The results demonstrate that offset, release, and wear resistance were significantly improved where the filler was treated with a silane coupling agent solution and this improvement was not at the cost of sacrificing the thermal conductivity.

EXAMPLE 5 (E-5)

The compounded formulation used for the fuser roller outer layer is the same as in Example 4 (E-4). The fuser roller was prepared as follows;:

A cylindrical stainless steel core was cleaned with dichloromethane and dried. The core was then primed with a uniform coat of a metal oxide primer, Dow 1200 RTV Primer Coat™ primer, marketed by Dow Corning Corp. of Midland, Mich. Silatic™ J RTV (room temperature cured) silicon rubber, marketed same by Dow Corning, were than mixed with catalyst and injection molded onto the core and cured at 232° C. for 2 hours under 75 tons/inch$^2$ of pressure. The roller was then removed from the mold and cured in a convection oven with a ramp to 232° C. for 24 hours and at 232° C. for 24 hours. After air cooling, EC-4952, a silicone rubber elastomer marketed by Emerson Cunning Division of W.R. Grace and Co. of Conn., was blade coated directly onto the Silastic™ J layer, then cured for 12 hours at about 210° C., followed by 48 hours at 218° C. in a convection oven. After air cooling, the EC-4952 was grounded to 20 mil. The cured EC-4952 was corona discharged for 15 minutes at 750 Watts and the outer layer was applied.

The outer layer was prepared as a 25 wt. % solid solution in a 85:15 mixture of methyl ethyl ketone and methanol. The resulting material was ring coated onto the EC-4952 layer, air dried for 16 hours, baked with ramping for 4 hours to 205° C., and kept at 205° C. for 12 hours. The resulting outer layer had a thickness of 1 mil.

The cushion layers of EC-4952 and Silastic™ J are optional and preferred. Where the base cushion layer is absent, the fluoroelastomer layer is coated directly onto the metal core. Also optionally, the base cushion layer can contain thermally conductive fillers such as aluminum oxide, iron oxide and silica. Further, there can be an optional adhesive layer deposited between the base cushion layer and the fluoroelastomer layer.

The fuser roller was used for machine test for jam rates, dry release and heating roller contamination as shown in Table 2.

COMPARATIVE EXAMPLE 3 (C-3)

The compounded formulation used for the fuser outer layer is the same as in Comparative Example 2 (C-2). The fuser roller was prepared the same as in Example 5 and the test results are indicated in Table 2.

Test Methods for Results in Table 2

The three tests described immediately below were conducted using the fuser roller of example 5 (E-5) and comparative example 6 (C-6). Results appear in Table 2.

Jam rates:

The fuser roll and heater roll were installed along with other components (oiler and functional release agent, etc.) and the fuser parameters were set to 365° F. idle temperature and 0.350" nip. Nine thousand copies of 4 different images (blank, Gutenbergs, TT65 and contamination) and papers were run. Another 3,000 copies were run; these were of a stress release image using 16# paper at the above condition. The jam rate used was: Jams/3000. These tests were repeated twice as described above, but instead, the temperatures; were 340° F. and 395° F. idle temperature allowing the nip to vary with the temperature change.

Dry release:

After the jam rate test, this test was set up at 365° F. idle temperature and 0.35" nip. One thousand blank copies (plain paper) were run. The oiler wick was removed and the stress release image run for three consecutive jams and the total copy count for the three jams was recorded as dry release.

Heating roller contamination:

After the dry release test, the cross sectional area of any toner built up on the heater roll surface ($E^{-6}$ $in^2$) was recorded. Results are appear in Table 2.

TABLE 2

FE5840Q 100 pt with $Al_2O_3$/CuO fillers and amino-PDMS release fluid

| Sample ID | C-3 | E-5 |
|---|---|---|
| $Al_2O_3$/CuO | 140/50 untreated | 140/50 pre-treated |
| Jam rates: | | |
| 340° F. | 0 | 0 |
| 365° F. | 0.0003 | 0 |
| 395° F. | 0.0221 | 0 |
| Dry release | 40 | 180 |
| Heating roller contamination | 8000 | 4928 |

The results shown in Table 2 demonstrate that the roller of the invention provides improvement over the comparative examples in all the parameters tested. The jam rate test was particularly impressive and dry release was improved by a factor greater than four.

The invention has been described in detail with particular reference to certain preferred embodiments thereof, but it will be understood that variations and modifications can be effected within the spirit and scope of the invention.

What is claimed is:

1. A fuser member characterized by improved offset, release and wear resistance without sacrificing thermal-conductivity comprising a support and coated thereon a fluoroelastomer layer comprising a metal oxide filler, said filler having been interacted with a silane coupling agent having the structure:

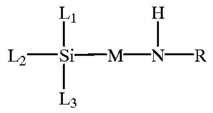

or

-continued

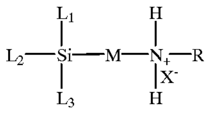

wherein:

M- is an aliphatic or aromatic chain with C atom numbers that vary from 0–20,

R- is a proton, phenyl or alkyl,

L1, L2, L3- is Alkoxy, alkyl, halide, with C atom numbers varying from 0–10 and at least one of the L is alkoxy or halide, and wherein $X^-$- is a negative counterion of chloride or bromide.

2. The fuser member of claim 1 wherein the fluoroelastomer comprises repeat units of:

$-(CH_2CF_2)_x-$, $-(CF_2CF_2)_y-$, and

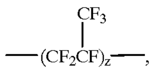

where x is from 30 to 90 mole percent, y is from 10 to 70 mole percent, and z is from 0 to 30 mole percent.

3. The fuser member of claim 2, wherein x is 52 mole percent, y is 34 mole percent, and z is 14 mole percent.

4. The fuser member of claim 2, wherein x is 53 mole percent, y is 26 mole percent, and z is 21 mole percent.

5. The fuser member of claim 1 wherein said metal oxide filler is selected from a group consisting of aluminum oxide and cupric oxide.

6. The fuser member of claim 5 wherein said metal oxide filler is aluminum oxide ,and said aluminum oxide is present in amounts of 30 to 170 parts by weight per 100 parts by weight of the fluoroelastomer.

7. The fuser member of claim 5, wherein said metal oxide filler is cupric oxide and said cupric oxide is present in amounts of 10 to 50 parts by weight per 100 parts by weight of the fluoroelastomer.

8. The fuser member of claim 1 wherein the silane coupling agent comprises a functional group selected from the group consisting of alkoxy and halide.

9. The fuser member of claim 1 wherein the silane coupling agent is selected from the group consisting of aminopropyl triethoxysilane, aminopropyl dimethoxyethoxysilane, and N-(2-Aminoethyl-3-aminopropyl trimethoxysilane.

10. A fuser member characterized by improved offset, release and wear resistance without sacrificing thermal conductivity comprising:

a support, a base cushion layer, and a fluoroelastomer outermost layer comprising a metal oxide filler, said filler having been interacted with a silane coupling agent having a reactive functional group of the structure:

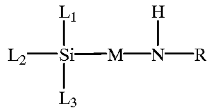

or

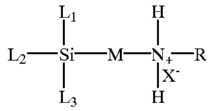

M- is an aliphatic or aromatic chain with C atom numbers that vary from 0–20,

R- is a proton, phenyl or alkyl,

L1, L2, L3- is Alkoxy, alkyl, halide, with C atom numbers varying from 0–10 and at least one of the L is alkoxy or halide, and wherein $X^-$- is a negative counterion of chloride or bromide.

11. The fuser member of claim 10 wherein the base cushion layer comprises silicone rubber.

12. The fuser member of claim 10 wherein the base cushion layer contains a thermally conductive filler.

13. The fuser member of claim 10 further comprising an adhesion layer between the base cushion layer and the fluoroelastomer layer.

14. The fuser member of claim 1 or 10, further having a polydimethylsiloxane release agent applied to the fluoroelastomer layer in an amount sufficient to produce, upon incubation at elevated temperature, a surface having toner release properties on said outermost layer.

15. The fuser member of claim 14 wherein the polydimethylsiloxane release agent comprises an aminoalkyl functional group reactive with the fluoroelastomer.

16. The fuser member of claim 14 wherein the polydimethylsiloxane release agent comprises a functional group interactive with the silane coupling agent.

17. The toner fuser member of claim 14 wherein the polydimethylsiloxane release agent has the formula

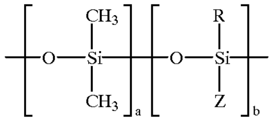

where R is alkyl or aryl, Z is selected from the group consisting of hydrogen, aminoalkyl containing up to about 8 carbon atoms, and mercaptoalkyl containing up to about 8 carbon atoms, and the ratio of a:b is about 1:1 to 3000:1.

18. The toner fuser member of claim 17 wherein Z is aminopropyl or hydrogen.

19. The fuser member of claim 17 wherein Z is hydrogen, aminopropyl, or mercaptopropyl.

20. The fuser member of claim 17 wherein Z is hydrogen and the a:b ratio is about 10:1 to 200:1.

21. The fuser member of claim 17 wherein Z is aminopropyl and the a:b ratio is about 200:1 to 2,000:1.

* * * * *